United States Patent
Feng

(10) Patent No.: US 9,588,757 B2
(45) Date of Patent: Mar. 7, 2017

(54) DATA UPDATE METHOD, USER TERMINAL, AND DATA UPDATE SYSTEM

(71) Applicant: TENCENT TECHNOLOGY (SHENZHEN) COMPANY LIMITED, Shenzhen, Guangdong (CN)

(72) Inventor: Feng Feng, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 15/036,979

(22) PCT Filed: Feb. 2, 2015

(86) PCT No.: PCT/CN2015/072069
§ 371 (c)(1),
(2) Date: May 16, 2016

(87) PCT Pub. No.: WO2015/081905
PCT Pub. Date: Jun. 11, 2015

(65) Prior Publication Data
US 2016/0274892 A1   Sep. 22, 2016

(30) Foreign Application Priority Data
Dec. 2, 2013   (CN) .......................... 2013 1 0633329

(51) Int. Cl.
*G06F 9/445* (2006.01)
*G06F 9/48* (2006.01)
(Continued)

(52) U.S. Cl.
CPC .............. *G06F 8/65* (2013.01); *G06F 9/4831* (2013.01); *H04L 47/2466* (2013.01); *H04L 47/762* (2013.01); *H04L 67/34* (2013.01)

(58) Field of Classification Search
None
See application file for complete search history.

(56) References Cited

U.S. PATENT DOCUMENTS

2005/0132348 A1* 6/2005 Meulemans .............. G06F 8/65
717/168
2007/0288423 A1  12/2007 Kimoto
(Continued)

FOREIGN PATENT DOCUMENTS

| CN | 1710539 A | 12/2005 |
| CN | 102067102 A | 5/2011 |
| CN | 103631625 A | 3/2014 |

OTHER PUBLICATIONS

International Search Report and Written Opinion of the ISA for PCT/CN2015/072069, ISA/CN, Haidian District, Beijing, mailed Apr. 29, 2015.

*Primary Examiner* — Lewis A Bullock, Jr.
*Assistant Examiner* — Wynuel Aquino
(74) *Attorney, Agent, or Firm* — Harness, Dickey & Pierce, P.L.C.

(57) ABSTRACT

A data update method, a client, a server and a system for data update are provided. Identifiers and update priorities of data strings to be updated in an application data packet are acquired. The data strings to be updated are classified, according to a predetermined threshold, as data strings to be updated having priority higher than the predetermined threshold and data strings to be updated having priority lower than or equal to the predetermined threshold. Before the application data packet is started, update data of the data strings to be updated having priority higher than the predetermined threshold are acquired and updated. After the application data packet are started, the update data of the (Continued)

data strings to be updated having priority lower than or equal to the predetermined threshold are acquired and updated.

9 Claims, 7 Drawing Sheets

(51) Int. Cl.
*H04L 29/08* (2006.01)
*H04L 12/855* (2013.01)
*H04L 12/923* (2013.01)

(56) References Cited

U.S. PATENT DOCUMENTS

| | | | |
|---|---|---|---|
| 2009/0094600 A1* | 4/2009 | Sargaison | G06F 8/61 717/177 |
| 2009/0305778 A1 | 12/2009 | Yu et al. | |
| 2010/0306652 A1* | 12/2010 | Bolger | H04L 67/2847 715/706 |
| 2011/0185353 A1* | 7/2011 | Matthew | G06F 8/61 717/178 |
| 2011/0307884 A1* | 12/2011 | Wabe | G06F 8/60 717/178 |

\* cited by examiner

DATA UPDATE METHOD, USER TERMINAL, AND DATA UPDATE SYSTEM

The present disclosure is a national phase of International Application No. PCT/CN2015/072069, titled "DATA UPDATE METHOD, USER TERMINAL, AND DATA UPDATE SYSTEM", filed on Feb. 2, 2015, which claims the priority to Chinese Patent Application No. 201310633329.7, titled "METHOD, CLIENT, SERVER AND SYSTEM FOR ACQUIRING DATA", filed on Dec. 2, 2013 with the State Intellectual Property Office of People's Republic of China, the content of which are incorporated herein by reference.

FIELD

The present disclosure relates the technical field of data processing, and in particular to a data update method, a client and a data update system.

BACKGROUND

A client of a network game generally contains multiple types of resource files, for example background pictures, sound effect files, scene videos and so on. These resource files change as a version of the game is upgraded. Presently, for many game products, the resource files are updated using an upgrade kit generally, i.e., resource files to be updated are packaged in an upgrade kit of the game each time. A user has to download the newest upgrade kit before logging into the game, and the user may start the game only after it is upgraded successfully.

In the art, the user can play the game only after it is upgraded successfully, thereby resulting in long waiting time. The user even can not use some game functions due to update failure in a case of a poor network speed or a machine fault.

SUMMARY

A data update method, a client and a data update system are provided according to embodiments of the present disclosure.

A data update method is provided according to embodiments of the present disclosure, which includes:

acquiring identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold;

acquiring update data for the data strings to be updated having the update priorities higher than the predetermined threshold according to the identifiers of the data strings to be updated and updating the data strings to be updated having the update priorities higher than the predetermined threshold, before the application data packet is started; and acquiring update data for the data strings to be updated having the update priorities lower than or equal to the predetermined threshold according to the identifiers of the data strings to be updated and updating the data strings to be updated having the update priorities lower than or equal to the predetermined threshold, after the application data packet is started.

A client is provided according to embodiments of the present disclosure, which includes one or more processors and a storage medium storing operation instructions, where when the operation instructions in the storage medium are run, the processors are configured to:

acquire identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold;

acquire update data for the data strings to be updated having the update priorities higher than the predetermined threshold according to the identifiers of the data strings to be updated and update the data to be updated having the update priorities higher than the predetermined threshold, before the application data packet is started; and acquire update data for the data strings to be updated having the update priorities lower than or equal to the predetermined threshold according to the identifiers of the data strings to be updated and update the data to be updated having the update priorities lower than or equal to the predetermined threshold, after the application data packet is started.

A data update system is provided according to embodiments of the present disclosure, which includes a client, a resource management server and a resource server, where the client is communicatively connected to the resource management sever and the resource server respectively, and where the client is configured to acquire, from the resource management server, identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold; acquire update data for the data strings to be updated having the update priorities higher than the predetermined threshold from the resource server according to the identifiers of the data strings to be updated and update the data to be updated having the update priorities higher than the predetermined threshold, before the application data packet is started; and acquire update data for the data strings to be updated having the update priorities lower than or equal to the predetermined threshold from the resource server according to the identifiers of the data strings to be updated and update the data to be updated having the update priorities lower than or equal to the predetermined threshold, after the application data packet is started;

the resource management server is configured to send the identifiers and the update priorities of the data strings to be updated in the application data packet to the client; and the resource server is configured to provide the update data for the data strings to be updated to the client.

With the method provided by the embodiments of the present disclosure, data strings to be updated in the application data packet are classified as data strings to be updated higher than the predetermined threshold and data strings to be updated lower than or equal to the predetermined threshold, and the data strings to be updated lower than or equal to the predetermined threshold can be updated after the application data packet is run, thereby reducing waiting time of a user.

DETAILED DESCRIPTION OF THE EMBODIMENTS

Hereinafter technical solutions in embodiments of the present disclosure are described clearly and completely in conjunction with drawings in the embodiments of the present disclosure. Apparently, the described embodiments are only some rather than all of the embodiments of the present disclosure. Any other embodiments obtained based on the embodiments of the present disclosure by those skilled in the art without any creative work fall within the scope of protection of the present disclosure.

Figure 1:
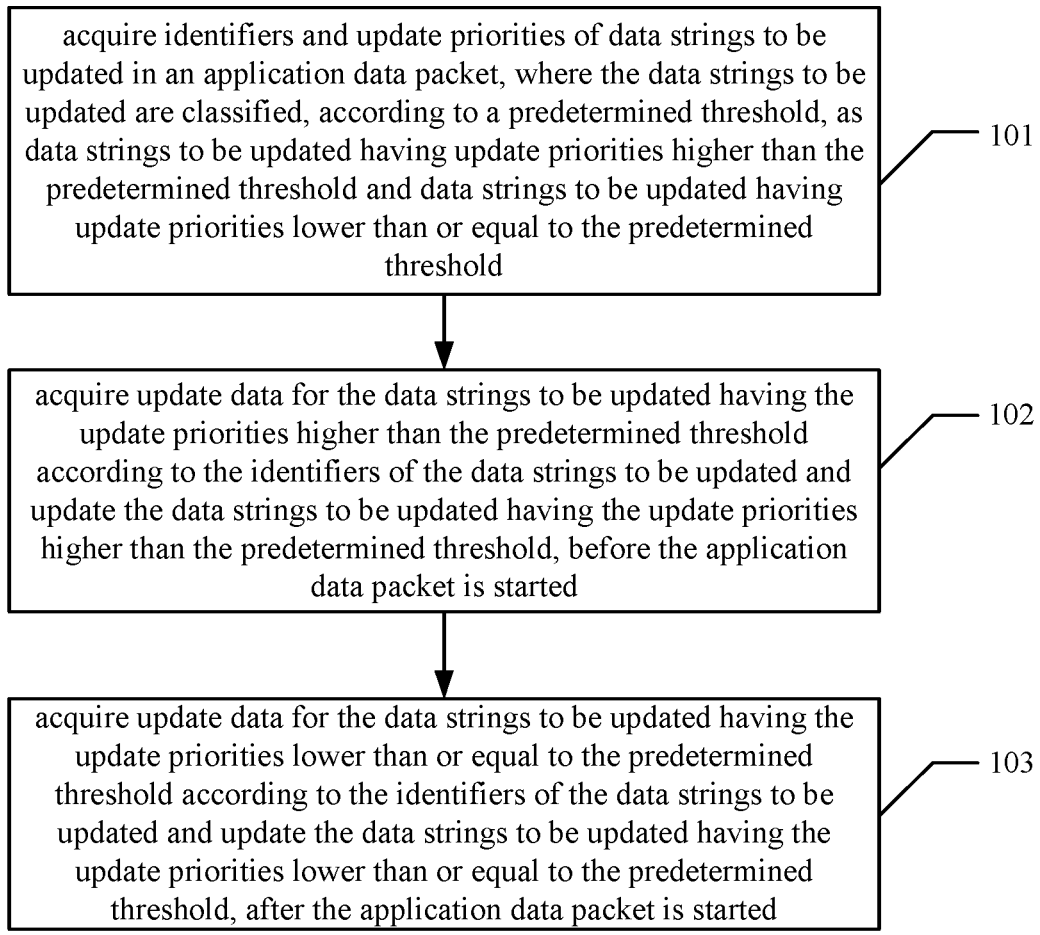
FIG. 1 is a schematic flowchart of a data update method according to an embodiment of the present disclosure.

As shown in FIG. 1, a data update method according to an embodiment of the present disclosure includes step 101 to step 103. The method may be applied to a terminal device such as a personal computer or a mobile phone.

In step 101, identifiers and update priorities of data strings to be updated in an application data packet are acquired, where the data strings to be updated are classified, according to a predetermined threshold, as data strings to be updated having update priorities higher than the predetermined threshold and data strings to be updated having update priorities lower than or equal to the predetermined threshold.

In the embodiment of the present disclosure, the application data packet may be a game data packet, a WeChat data packet or a microblog data packet or the like.

One application data packet may contain multiple data strings.

An identifier of a data string to be updated may be a name of the data string to be updated, or any other identifier which can be used to uniquely identify the data string to be updated.

For example, if application data packet 1 includes 10 data strings with 6 data strings to be updated, identifiers of the 6 data strings to be updated may be acquired, which are data string A, data string B, data string C, data string D, data string E and data string F respectively for example.

It is assumed that update priorities of both the data string A and the data string B are 1, an update priority of the data string C is 2, update priorities of the data string D and the data string E are 3, and an update priority of the data string F is 4. In addition, in the embodiment, the smaller the value of the update priority is, the higher the level of the update priority is. The levels of the update priorities of the data string A and the data string B are the highest.

If the predetermined priority threshold is 2, only the priority 1 is higher than the predetermined priority threshold. Data strings having priority levels higher than the predetermined threshold include the data string A and the data string B. The predetermined threshold may be set as other values, and the threshold may be determined according to the actual running condition of the application data packet.

In the embodiments of the present disclosure, the data strings having update priorities higher than the predetermined threshold may be required to start the application data packet.

In step 102, before the application data packet is started, update data for the data strings to be updated having the update priorities higher than the predetermined threshold is acquired according to the identifiers of the data strings to be updated, and the data strings to be updated having the update priorities higher than the predetermined threshold are updated.

In step 103, after the application data packet is started, update data for the data strings to be updated having the update priorities lower than or equal to the predetermined threshold is acquired according to the identifiers of the data strings to be updated, and the data strings to be updated having the update priorities lower than or equal to the predetermined threshold are updated.

With the method according to the embodiment, data strings to be updated in the application data packet are classified as data strings to be updated higher than the predetermined threshold and data strings to be updated lower than or equal to the predetermined threshold, and the data strings to be updated lower than or equal to the predetermined threshold can be updated after the application data packet is run, thereby reducing waiting time of a user.

Figure 2:
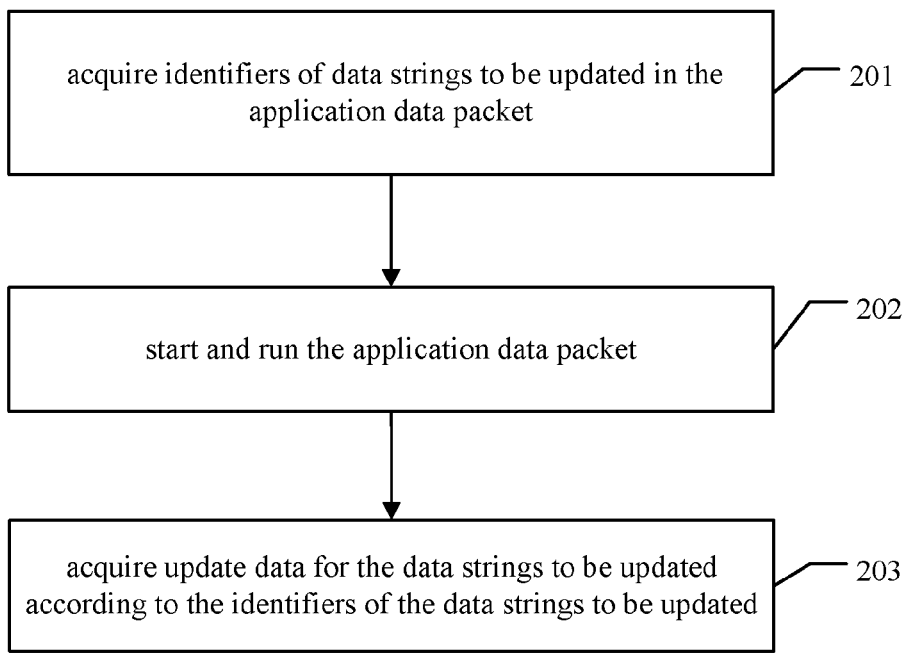
FIG. 2 is a schematic flowchart of another data update method according to an embodiment of the present disclosure.

As shown in FIG. 2, a data update method according to an embodiment of the present disclosure includes step 201 to step 203. The method may be applied to a terminal device such as a personal computer or a mobile phone.

In step 201, identifiers of data strings to be updated in an application data packet are acquired.

In the embodiment of the present disclosure, the application data packet may be a game data packet, a WeChat data packet or a microblog data packet or the like.

One application data packet may contain multiple data strings.

An identifier of a data string to be updated may be a name of the data string to be updated, or any other identifier which can be used to uniquely identify the data string to be updated.

For example, if application data packet 1 includes 10 data strings with 6 data strings to be updated, identifiers of the 6 data strings to be updated may be acquired, which are data string A, data string B, data string C, data string D, data string E and data string F respectively for example.

In step 202, the application data packet is started and run. The starting of the application data packet may include starting a game or starting other applications, and it is to run the game or other applications after starting.

In step 203, update data for the data strings to be updated is acquired according to the identifiers of the data strings to be updated.

In the embodiment of the present disclosure, the update data for the data strings to be updated may be acquired from a resource server storing the data strings to be updated simultaneously when the game or other applications is run.

With the technical solution provided by the embodiment of the present disclosure, the identifiers of the data strings to be updated in the application data packet are acquired, the application data packet is started and run, and the update data for the data strings to be updated is acquired according to the identifiers of the data strings to be updated. With the method according to the embodiment of the present disclosure, the update data for the data strings to be updated in the application data packet can be acquired when the application data packet is run, thereby reducing waiting time of a user.

Optionally, based on the embodiment corresponding to FIG. 2, in another embodiment of the data update method according to the embodiments of the present disclosure, the acquiring identifiers of data strings to be updated in the application data packet may include:

acquiring, from a resource management server, a list of data to be updated of the application data packet, where the list of data to be updated is used to describe identifiers of data strings to be updated in the application data packet to be started and update priorities of the data strings to be updated.

In the embodiment of the present disclosure, the resource management server is configured to manage identifiers of application data packets and identifiers of data strings in the data packets for various applications.

For example, if application data packet 1 includes 10 data strings with 6 data strings to be updated, identifiers of the 6 data strings to be updated may be acquired, which are data string A, data string B, data string C, data string D, data string E and data string F respectively for example.

The list of data to be updated may be understood by referring to table 1:

TABLE 1

| List of data to be updated | | |
| --- | --- | --- |
| identifier of an application data packet | identifiers of data strings to be updated | update priorities |
| data packet 1 | A | 1 |
| | B | 1 |
| | C | 2 |
| | D | 3 |
| | E | 3 |
| | F | 4 |

Table 2 shows that, update priorities of the data string A and the data string B are 1, an update priority of the data string C is 2, update priorities of the data string D and the data string E are 3, and an update priority of the data string F is 4. The smaller the value of the update priority is, the higher the level of the update priority is. The levels of the update priorities of the data string A and the data string B are the highest.

Optionally, based on the optional embodiment corresponding to FIG. 2, in another embodiment of the data update method provided according to the embodiments of the present disclosure, in a case that the data strings to be updated include data strings having update priorities higher than the predetermined priority threshold and before the application data packet is started, the method may include:

acquiring, from the resource server, update data for the data strings to be updated having the update priorities higher than the predetermined priority threshold, and updating the data strings having the update priorities higher than the predetermined priority threshold.

In the embodiment of the present disclosure, the data strings having the update priorities higher than the predetermined priority threshold may be required to start the application data packet.

In the embodiment of the present disclosure, the resource server is a server for storing data resource required by a client.

The predetermined priority threshold may be 2 or other values, and the threshold may be determined according to the actual condition of the application data packet. If the predetermined priority threshold is 2, only the priority 1 is higher than the predetermined priority threshold. Referring to the table 1, data strings having priority levels higher than the predetermined priority threshold include the data string A and the data string B.

The application data packet 1 is updated using the data string A and the data string B. After the application data packet 1 is updated, the updated application data packet 1 containing the data string A and the data string B is started and run.

Optionally, based on the optional embodiment corresponding to FIG. 2, in another embodiment of the data update method provided by the embodiments of the present disclosure, acquiring the data strings to be updated according to the identifiers of the data strings to be updated when the application data packet to be started is run may include:

acquiring, from the resource server, update data for the data strings to be updated having the update priorities equal to or lower than the predetermined priority threshold, when the updated application data packet is run.

In the embodiment of the present disclosure, as shown in the table 1, data strings having the update priorities equal to or lower than the predetermined priority threshold include the data string C, the data string D, the data string E and the data string F. Update data for the data string C, the data string D, the data string E and the data string F may be acquired from the resource sever when the updated application data packet is run, thereby reducing time delay.

Optionally, based on any of the above optional embodiments, in another embodiment of the data update method provided by embodiments of the present disclosure, the method may further include:

acquiring, from the resource management server, identifiers of data strings to be removed in the application data packet; and deleting, according to the identifiers of the data strings to be removed, the data strings to be removed in the application data packet.

In the embodiment of the present disclosure, for the updated data strings, the prior data strings of an old version are not useful any more. If the data strings of the old version are stored in the client continuously, they will occupy the storage space of the client, so that the client runs slowly. The client may acquire identifiers of data strings to be removed in the application data packet from the resource management server, and delete the data string to be removed in the application data packet according to the identifiers of the data strings to be removed.

For example, data string a, data string b, data string c, data string d, data string e and data string f of the old version in the application data packet 1 are not useful any more, the client may delete the data string a, the data string b, the data string c, the data string d, the data string e and the data string f.

Optionally, based on the above optional embodiment, in another optional embodiment of the data update method provided by embodiments of the present disclosure, acquiring, from the resource management server, identifiers of the data strings to be removed in the application data packet may include:

sending a request for data to be removed to the resource management server, where the request for data to be removed carries the identifier of the application data packet; and receiving a list of data to be removed from the resource management server, where the list of data to be removed includes identifiers of data strings to be removed in the application data packet.

In the embodiment of the present disclosure, the client may send the request for data to be removed to the resource management server, where the request for data to be removed carries identifier 1 of the application data packet to be started. The list of data to be removed may be understood by referring to a table 2.

TABLE 2

List of data to be removed

| identifier of an application data packet | identifiers of data strings to be removed |
|---|---|
| data packet 1 | a |
|  | b |
|  | c |
|  | d |
|  | e |
|  | f |

The table 2 shows that, the client may delete the data string a, the data string b, the data string c, the data string d, the data string e and the data string f after receiving the table 2.

Figure 3:
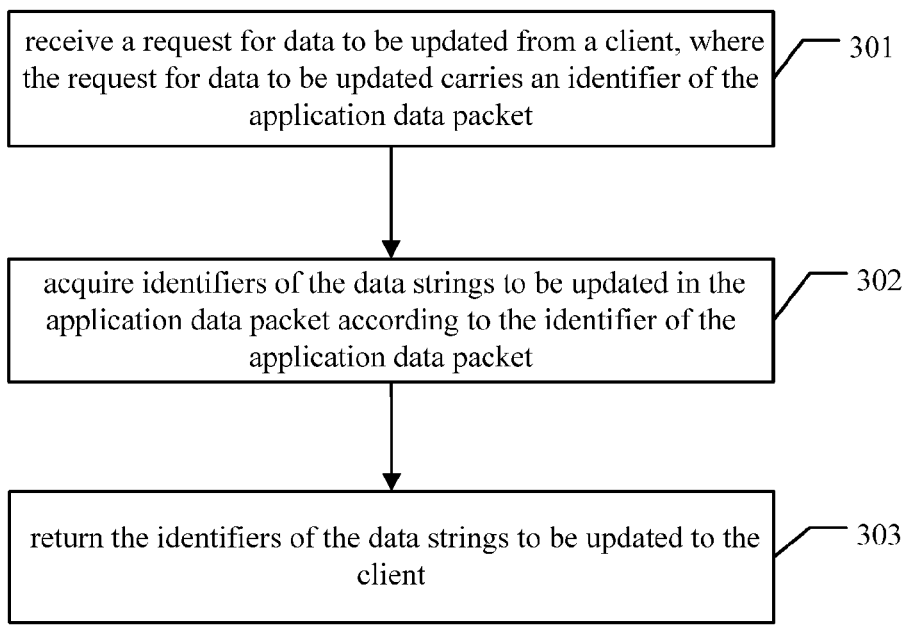
FIG. 3 is a schematic flowchart of another data update method according to an embodiment of the present disclosure.

As shown in FIG. 3, in another embodiment of the data update method provided by the embodiments of the present disclosure, the method includes step 301 to step 303. The method may be applied to devices such as a resource management server.

In step 301, a request for data to be updated from a client is received, where the request for data to be updated carries an identifier of an application data packet.

In step 302, identifiers of data strings to be updated in the application data packet are acquired according to the identifier of the application data packet.

The resource management server stores the identifier of the application data packet and the identifiers of the data strings to be updated in the application data packet in an association manner.

For example, reference is made to a table 3 which is an association table of the identifier of the application data packet and the identifiers of the data strings in the application data packet stored in the resource management server.

TABLE 3

Association table of identifiers

| identifier of the application data packet | identifiers of data strings of an old version | identifiers of data strings to be updated |
|---|---|---|
| data packet 1 | a | A |
|  | b | B |
|  | c | C |
|  | d | D |

TABLE 3-continued

Association table of identifiers

| identifier of the application data packet | identifiers of data strings of an old version | identifiers of data strings to be updated |
|---|---|---|
|  | e | E |
|  | f | F |
|  | g | g |
|  | h | h |
|  | i | i |
|  | j | j |

The resource management sever may determine, from the table 3, that identifiers of the data strings to be updated are A, B, C, D, E and F respectively.

In step 303, the identifiers of the data strings to be updated are returned to the client.

In the embodiment of the present disclosure, the request for data to be updated from the client is received, where the request for data to be updated carries the identifier of the application data packet; the identifiers of the data strings to be updated in the application data packet are acquired according to the identifier of the application data packet; the identifiers of the data strings to be updated are returned to the client; and the client can update corresponding data strings according to the received identifiers of the data strings as needed.

Optionally, based on the embodiment corresponding to FIG. 3, in another embodiment of the data update method provided by the embodiments of the present disclosure, acquiring identifiers of data strings to be updated in the application data packet to be started according to the identifier of the application data packet to be started may include:

acquiring update priorities of the data strings to be updated.

Returning the identifiers of the data strings to be updated to the client may include:

returning a list of data to be updated of the application data packet to the client, where the list of data to be updated includes the identifiers of the data strings to be updated and the update priorities of the data strings to be updated in the application data packet.

In the embodiment of the present disclosure, the resource management server may acquire the update priorities of the data strings to be updated when acquiring the identifiers of the data strings to be updated. The list of data to be updated returned to the client by the resource management server may be understood by referring to the table 1.

Optionally, based on the embodiment corresponding to FIG. 3 and the optional embodiments corresponding to FIG. 3, in another optional embodiment of the data update method provided by embodiments of the present disclosure, the method may further include:

receiving a request for data to be removed from the client, where the request for data to be removed carries the identifier of the application data packet;

acquiring, according to the identifier of the application data packet, identifiers of data strings to be removed in the application data packet; and sending a list of data to be removed to the client, where the list of data to be removed includes the identifiers of the data strings to be removed in the application data packet.

In the embodiment of the present disclosure, the resource management server may determine, from the table 3, that data strings having identifiers a, b, c, d, e and f in the application data packet 1 are not useful any more. In a case that the client requests to remove data strings of an old version in the application data packet 1, the resource management server may determine that the data string a, the data string b, the data string c, the data string d, the data string e and the data string f are to be removed, and return the identifiers of the data strings to be removed to the client, which may be presented in a list of data to be removed. The list of data to be removed may be understood by referring to the table 2, which is not described here.

In order to facilitate understanding, hereinafter the process of data update in the embodiments of the present disclosure is described by taking a game application scene as an example.

Figure 4:
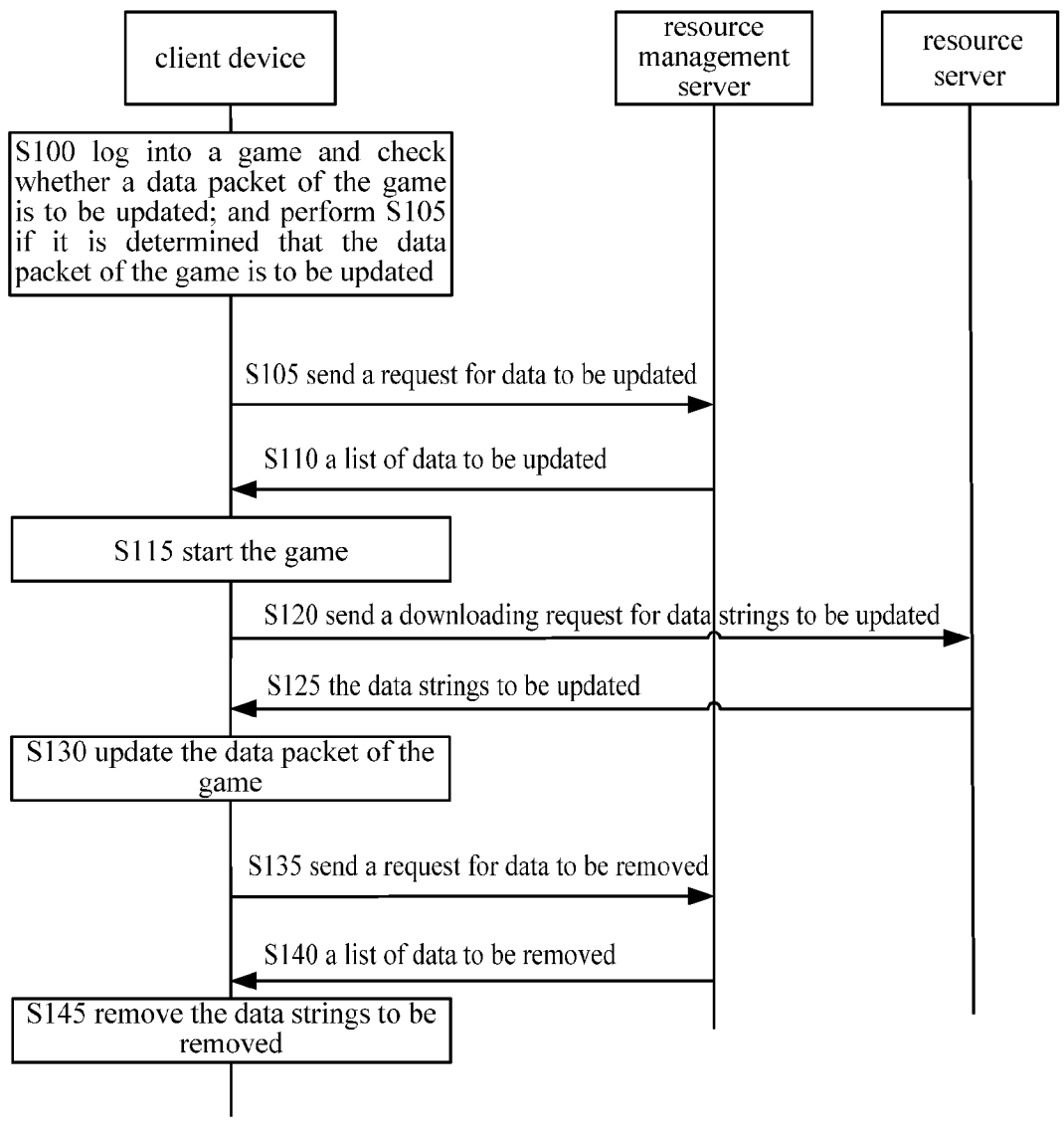
FIG. 4 is a schematic flowchart of another data update method according to an embodiment of the present disclosure.

As shown in FIG. 4, the process of data update in an embodiment of the present disclosure includes step S100 to step S145.

In step S100, a client checks whether a data packet of a game is to be updated when logging into the game. In a case that it is determined that the data packet of the game is to be updated, step S105 is performed.

Each type of game has one application data packet. In the embodiment of the present disclosure, only the data packet of the game into which the client logs is checked.

In step S105, the client sends a request for data to be updated to a resource management server, where the request for data to be updated carries an identifier of the data packet of the game to be logged.

In step S110, the resource management server returns a list of data to be updated of the data packet of the game to be logged, where the list of data to be updated is used to describe identifiers of data stings to be updated and update priorities of the data stings to be updated in the data packet of the game to be logged.

In step S115, the client starts to run the data packet of the game.

The client starts the game for entertainment of a user.

In step S120, the client sends a downloading request for the data strings to be updated to a resource server, where the downloading request for the data strings to be updated carries the identifiers of the data strings to be updated.

In step S125, the resource server acquires the identifiers of the data strings to be updated in the data packet of the game according to the identifier of the data packet of the game, and sends update data for the data strings to be updated corresponding to the identifiers of the data strings to be updated to the client.

In step S130, the client updates the data packet of the game using the update data for the data strings to be updated.

In step S135, the client sends a request for data to be removed to the resource management server, where the request for data to be removed carries the identifier of the data packet of the game.

In step S140, the resource management server acquires identifiers of data strings to be removed in the data packet of the game according to the identifier of the data packet of the game, and sends a list of data to be removed to the client. The list of data to be removed is used to describe the identifiers of the data strings to be removed in the data packet of the game.

In step S145, the client removes corresponding data strings according to the identifiers of the data strings to be removed.

As compared with the method in the conventional technology where the application data packet is not run until all the data strings to be updated are acquired, with the method provided by the embodiment of the present disclosure, the data strings to be updated in the data packet of the game can be acquired when the data packet of the game is run, thereby reducing waiting time of a user.

Figure 5:
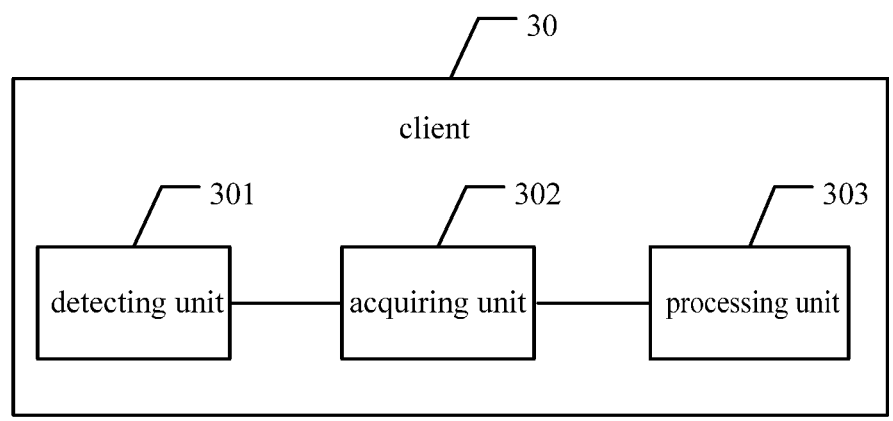
FIG. 5 is a schematic structural diagram of a client according to an embodiment of the present disclosure.

FIG. 5 is a schematic structural diagram of a client according to an embodiment of the present disclosure, and the client may be a terminal device such as a personal computer or a mobile phone. As shown in FIG. 5, a client 30 provided by the embodiment of the present disclosure includes a detecting unit 301, an acquiring unit 302 and a processing unit 303.

The detecting unit 301 is configured to detect whether an application data packet is to be updated.

The acquiring unit 302 is configured to acquire identifiers of data strings to be updated in the application data packet in a case that the detecting unit 301 detects that the application data packet is to be updated.

The processing unit 303 is configured to start and run the application data packet when the acquiring unit 302 acquires the identifiers of the data strings to be updated in the application data packet.

The acquiring unit 302 is configured to acquire the data strings to be updated according to the identifiers of the data strings to be updated when the processing unit 303 runs the application data packet.

The client provided by the embodiment of the present disclosure may acquire the data strings to be updated in the application data packet when running the application data packet, thereby reducing waiting time of a user.

Optionally, based on the embodiment corresponding to FIG. 5, in another embodiment of the client 30 provided by the embodiments of the present disclosure, the acquiring unit 302 is configured to acquire a list of data to be updated of the application data packet from a resource management server, where the list of data to be updated may include the identifiers of the data strings to be updated and update priorities of the data strings to be updated in the application data packet.

Figure 6:
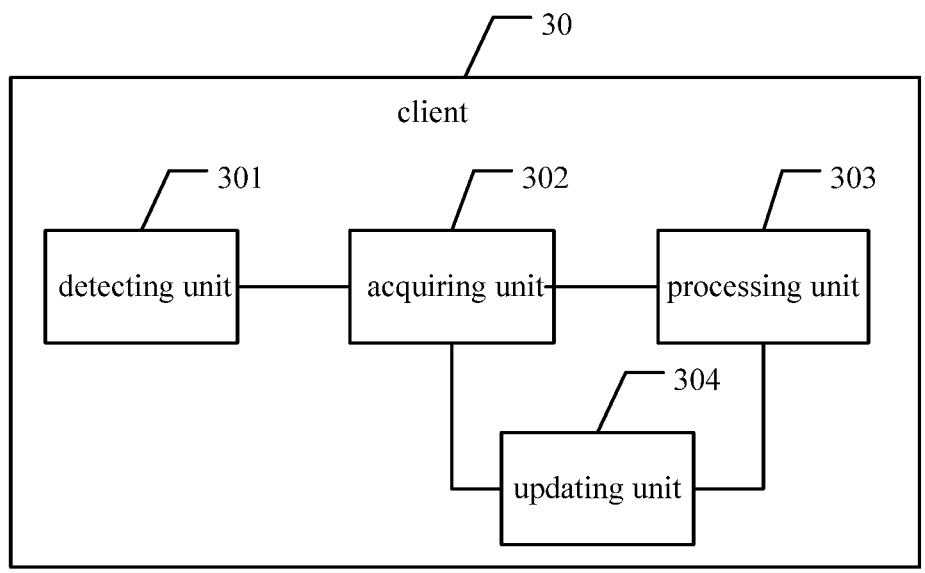
FIG. 6 is a schematic structural diagram of another client according to an embodiment of the present disclosure.

Optionally, based on the optional embodiment corresponding to FIG. 5, as shown in FIG. 6, in another embodiment of the client 30 provided by the embodiments of the present disclosure, the acquiring unit 302 is further configured to acquire data strings to be updated having update priorities higher than a predetermined priority threshold from the resource server.

The client 30 further includes:

an updating unit 304, configured to update the application data packet to be started according to the data strings to be updated having the update priorities higher than the predetermined priority threshold which are acquired by the acquiring unit 302; and the processing unit 303 is configured to start the application data packet updated by the updating unit 304 and run the updated application data packet.

Optionally, based on the optional embodiment corresponding to FIG. 6, in another embodiment of the client 30 provided by the embodiments of the present disclosure, the acquiring unit 302 is configured to acquire data strings to be updated having update priorities equal to or lower than the predetermined priority threshold from the resource server when the updated application data packet is run.

Optionally, based on the embodiments or the optional embodiments corresponding to FIG. 5 or FIG. 6, in another embodiment of the client 30 provided by the embodiments of the present disclosure, the acquiring unit 302 is further configured to acquire identifiers of data strings to be removed in the application data packet from the resource management server; and the processing unit 303 is further configured to delete the data strings to be removed in the application data packet according to the identifiers of the data strings to be removed acquired by the acquiring unit 302.

Figure 7:
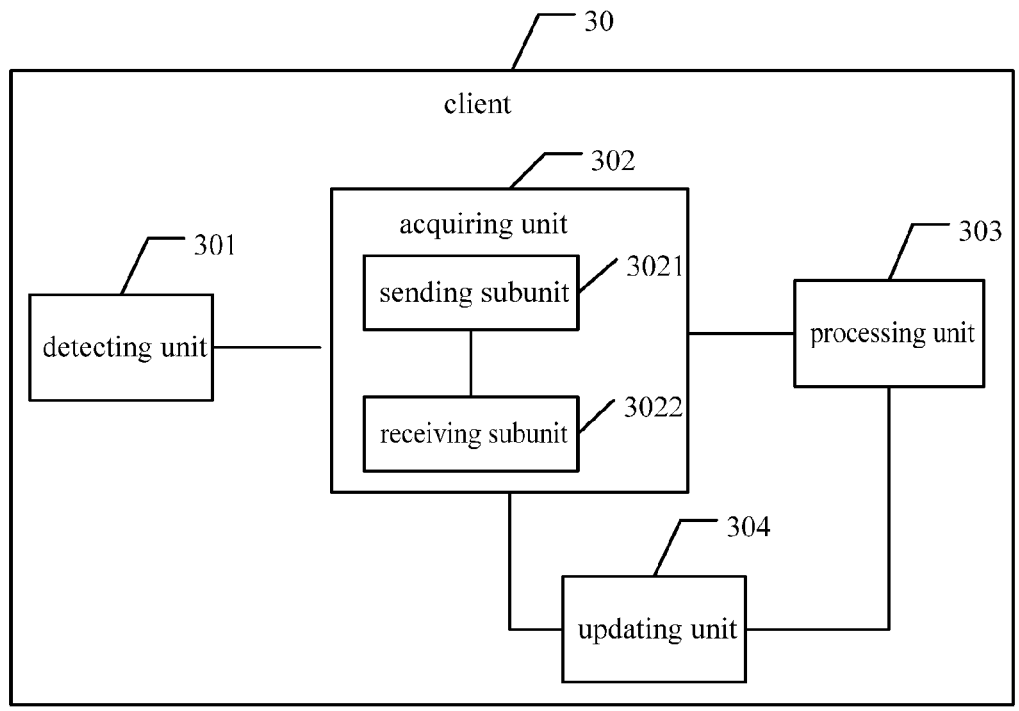
FIG. 7 is a schematic structural diagram of another client according to an embodiment of the present disclosure.

Optionally, based on the above embodiments, as shown in FIG. 7, in another optional embodiment of the client provided by the embodiments of the present disclosure, the acquiring unit 302 includes a sending subunit 3021 and a receiving subunit 3022.

The sending subunit 3021 is configured to send a request for data to be removed to the resource management server, where the request for data to be removed carries an identifier of the application data packet.

The receiving subunit 3022 is configured to receive a list of data to be removed from the resource management server, where the list of data to be removed may include the identifiers of the data strings to be removed in the application data packet.

Figure 8:
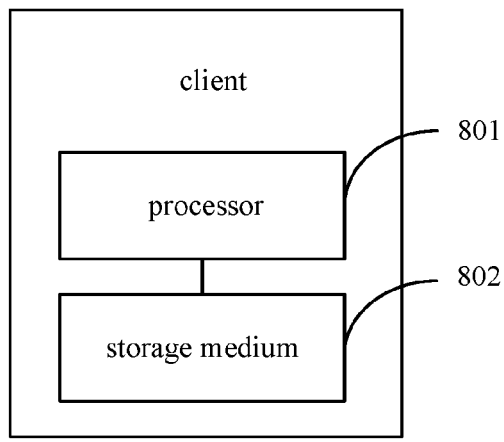
FIG. 8 is a schematic structural diagram of another client according to an embodiment of the present disclosure.

FIG. 8 is a schematic structural diagram of another client according to an embodiment of the present disclosure, and the client may be a terminal device such as a personal computer or a mobile phone. As shown in FIG. 8, the client includes one or more processors 801 and a storage medium 802 storing operation instructions. When the operation instructions in the storage medium 802 are run, the processors 801 are configured to:

acquire identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold;

acquire update data for the data strings to be updated having the update priorities higher than the predetermined threshold according to the identifiers of the data strings to be updated and update the data strings to be updated having the update priorities higher than the predetermined threshold, before the application data packet is started; and acquire update data for the data strings to be updated having the update priorities lower than or equal to the predetermined threshold according to the identifiers of the data strings to be updated and update the data strings to be updated having the update priorities lower than or equal to the predetermined threshold, after the application data packet is started.

Based on the above embodiment, in another optional embodiment, the processors 801 are configured to:

acquire a list of data to be updated of the application data packet from a resource management server, where the list of data to be updated includes the identifiers of the data strings to be updated and the update priorities of the data strings to be updated in the application data packet.

In another optional embodiment, the processors 801 may be further configured to:

send a request for updating data to the resource management server, where the request for updating data carries an identifier of the application data packet; and receive a list of data to be updated of the application data packet from the resource management server.

Optionally, based on the above embodiment, the processors 801 may be further configured to:

acquire identifiers of data strings to be removed in the application data packet from the resource management server; and delete the data strings to be removed in the application data packet according to the identifiers of the data strings to be removed.

Optionally, in removing the data strings, the processors 801 may be configured to:

send a request for data to be removed to the resource management server, where the request for data to be removed carries the identifier of the application data packet; and receive a list of data to be removed from the resource management server, where the list of data to be removed includes the identifiers of the data strings to be removed in the application data packet.

With the client provided by the embodiments of the present disclosure, data strings to be updated in the application data packet are classified as data strings to be updated higher than the predetermined threshold and data strings to be updated lower than or equal to the predetermined threshold, and the data strings to be updated lower than or equal to the predetermined threshold can be updated after the application data packet is run, thereby reducing waiting time of the user.

Figure 9:
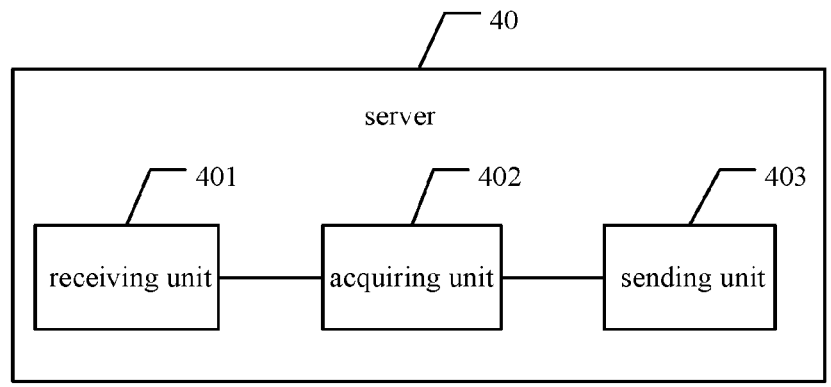
FIG. 9 is a schematic structural diagram of a server according to an embodiment of the present disclosure.

As shown in FIG. 9, a server 40 provided according to an embodiment of the present disclosure includes a receiving unit 401, an acquiring unit 402 and a sending unit 403.

The receiving unit 401 is configured to receive a request for data to be updated from a client, where the request for data to be updated carries an identifier of an application data packet.

The acquiring unit 402 is configured to acquire identifiers of data strings to be updated in the application data packet according to the identifier of the application data packet received by the receiving unit 401.

The sending unit 403 is configured to return the identifiers of the data strings to be updated acquired by the acquiring unit 402 to the client.

In the embodiment of the present disclosure, the receiving unit 401 receives the request for data to be updated from the client, where the request for data to be updated carries the identifier of the application data packet; the acquiring unit 402 acquires the identifiers of the data strings to be updated in the application data packet according to the identifier of the application data packet; the sending unit 403 returns the identifiers of the data strings to be updated to the client and the client may update corresponding data strings according to the received identifiers of the data strings as needed.

Optionally, based on the embodiment corresponding to FIG. 9, in another embodiment of the server provided by the embodiments of the present disclosure, the acquiring unit 402 is further configured to acquire update priorities of data strings to be updated; and the sending unit 403 is further configured to return a list of data to be updated of the application data packet to the client, where the list of data to be updated may include the identifiers of the data strings to be updated and the update priorities of the data strings to be updated in the application data packet.

Optionally, based on the embodiment or the optional embodiment corresponding to FIG. 9, in another embodiment of the server provided by the embodiments of the present disclosure, the receiving unit 401 is further configured to receive a request for data to be removed from the client, where the request for data to be removed carries the identifier of the application data packet to be started;

the acquiring unit 402 is further configured to acquire identifiers of data strings to be removed in the application data packet according to the identifier of the application data packet; and the sending unit 403 is further configured to send a list of data to be removed to the client, where the list of data to be removed may include the identifiers of the data strings to be removed in the application data packet.

The client in the embodiments of the present disclosure may be a client device such as a personal computer (PC), a mobile phone or a notebook computer.

Figure 10:
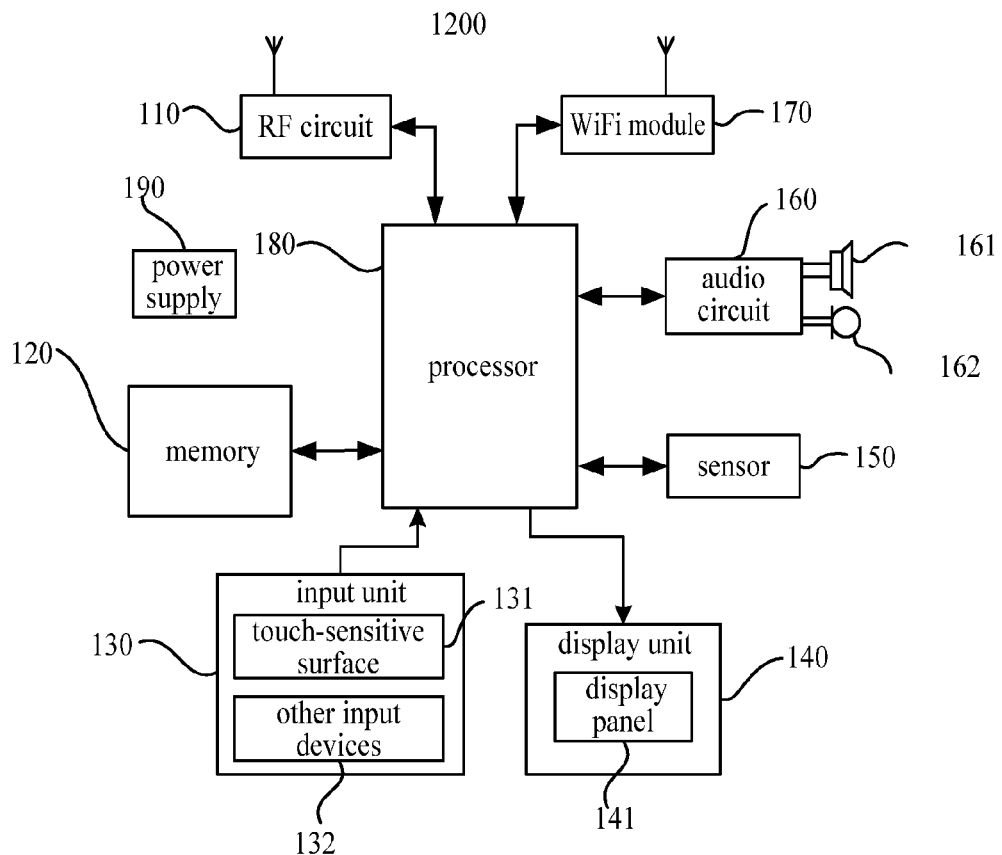
FIG. 10 is a schematic structural diagram of another client according to an embodiment of the present disclosure.

Reference is made to FIG. 10 which shows a schematic structural diagram of a client according to an embodiment of the present disclosure. The client may be configured to implement the data update method provided in the above embodiments.

The client 1200 may include a radio frequency (RF) circuit 110, a memory 120 including one or more computer readable storage mediums, an input unit 130, a display unit 140, a sensor 150, an audio circuit 160, a wireless fidelity (WiFi) module 170, a processor 180 including one or more processing cores and a power supply 190 and so on. Those skilled in the art should understand that, the client structure shown in FIG. 10 does not intend to limit the client, and the client may include more or less components than that shown in FIG. 10; or some components may be combined together or the components may be arranged in different ways.

The RF circuit 110 may be configured to receive and send a signal during receiving and sending of information or a call process, and particularly receive downlink information from a base station and then send the downlink information to one or more processors 180 for processing. In addition, the RF circuit 110 sends data for uplink to the base station. Generally, the RF circuit 110 includes but not limited to an antenna, at least one amplifier, a tuner, one or more oscillators, a subscriber identity module (SIM) card, a transceiver, a coupler, a low noise amplifier (LNA) and a duplexer. In addition, the RF circuit 110 may communicate with other devices over a wireless communication and network. The wireless communication may use any communication standard or protocol, including but not limited to global system of mobile communication (GSM), general packet radio service (GPRS), code division multiple access (CDMA), wideband code division multiple access (WCDMA), long term evolution (LTE), e-mail and short messaging service (SMS).

The memory 120 may be configured to store software programs and modules, and the processors 180 perform various types of functional applications and data processing by running the software programs and modules stored in the memory 120. The memory 120 may mainly include a program storage region and a data storage region. The program storage region may store an operating system and an application program required for at least one function (for example, a sound playing function and an image playing function) and so on. The data storage region may store data created based on the use of the client 1200 (for example audio data or a phone book). In addition, the memory 120 may include a high speed random access memory, and may further include a non-volatile memory, for example at least one magnetic disc storage device and a flash storage device, or other volatile solid state storage devices. Accordingly, the memory 120 may further include a memory controller via which the processors 180 and the input unit 130 access the memory 120.

The input unit 130 may be configured to receive input number or symbol information, and generate keyboard, mouse, operation bar, optical or trackball signal input related to user setting and function control. Specifically, the input unit 130 may include a touch-sensitive surface 131 and other input devices 132. The touch-sensitive surface 131 is also referred to as a touch display screen or a touchpad, which may collect a touch operation performed on or near the touch-sensitive surface (for example, an operation performed on the touch-sensitive surface 131 or near the touch-sensitive surface 131 by the user using any suitable object or accessory such as fingers or a stylus), and drive a corresponding connection apparatus according to a predetermined formula. Optionally, the touch-sensitive surface 131 may include two parts: a touch detection apparatus and a touch controller. The touch detection apparatus detects a touch direction of a user and a signal generated due to the touch operation, and sends the signal to the touch controller. The touch controller receives touch information from the touch detection apparatus, converts the touch information into coordinates of a touch point and sends the coordinates to the processors 180, and receives and executes commands sent by the processors 180. In addition, the touch-sensitive surface 131 may be implemented as a resistive surface, a capacitive surface, an infrared surface and a surface acoustic wave. In addition to the touch-sensitive surface 131, the input unit 130 may include other input devices 132. Specifically, other input devices 132 may include but not limited to one or more of a physical keyboard, a functional key (for example a volume control key or a switch key), a trackball, a mouse and an operation bar.

The display unit 140 may be configured to display information input by a user or information provided to the user, as well as various types of graphic user interfaces of the client 1200. These graphic user interfaces may be composed of graphs, texts, icons, videos and any combination thereof. The display unit 140 may include a display panel 141. Optionally, a liquid crystal display (LCD) and an organic light-emitting diode (OLED) may be adopted to configure the display panel 141. Furthermore, the touch-sensitive surface 131 may cover the display panel 141. When detecting a touch operation performed on or near the touch-sensitive surface 131, the touch-sensitive surface 131 informs the processors 180 to determine a type of the touch operation, and then the processors 180 provide corresponding visual output on the display panel 141 according to the type of the touch operation. Although in FIG. 10 the touch-sensitive surface 131 and the display panel 141 achieve input and input functions as two independent components, in some embodiments, the touch-sensitive surface 131 and the display panel 141 may be integrated to achieve the input and output functions.

The client 1200 may further include at least one type of sensor 150, for example an optical sensor, a motion sensor and other sensors. Specifically, the optical sensor may include an environmental optical sensor and a proximity sensor. The environmental optical sensor may adjust brightness of the display panel 141 according to the environmental light, and the proximity sensor may close the display panel 141 and/or backlight in a case that the client 1200 moves to the proximity of ears. As one type of motion sensor, a gravity acceleration sensor may detect magnitudes of accelerations in various directions (generally in three axes), and detect magnitude and direction of gravity in a static state. The gravity acceleration sensor may be configured to identify an application of mobile phone gestures (for example, switching between a horizontal screen and a vertical screen, related games and magnetometer attitude calibration) and functions related to vibration identification (for example a pedometer and knocking). Other sensors may be provided in the client 1200, for example a gyroscope, a barometer, a hygrometer, a thermometer, and an infrared sensor, which are not described here.

The audio circuit 160, a loudspeaker 161 and a microphone 162 may provide an audio interface between a user and the client 120. The audio circuit 160 may transmit an electrical signal which is converted from the received audio data to the loudspeaker 161, and the loudspeaker 161 converts the electrical signal into a sound signal for outputting. In another aspect, the microphone 162 converts the collected sound signal into an electrical signal; the audio circuit 160 receives the electrical signal, converts the electrical signal into audio data, and outputs the audio data to the processor 180; and the audio data is processed by the processor 180 and then is sent to another client for example via the RF circuit 110, or the audio data is output to the memory 120 for further processing. The audio circuit 160 may further include an earphone jack via which an external headset communicates with the client 1200.

WiFi is short-distance wireless transmission technology, and the client 1200 may assist the user to receive and send an e-mail, browse the web or access a streaming media via a WiFi module 170. The WiFi provides wireless broadband internet access for the user. Although the WiFi module 170 is shown in FIG. 10, it should be understood that the WiFi module 170 is not essential for the client 1200, and can be omitted as needed without departing from the essence of the present disclosure.

The processor 180 is a control center of the client 1200, and is connected to various parts of the whole mobile phone via various interfaces and lines. The processor 180 performs various functions of the client 1200 and processes data by running or executing software programs and/or modules stored within the memory 120 and calling data stored within the memory 120, thereby monitoring the mobile phone integrally. Optionally, the processor 180 may include one or more processing cores. Preferably, an application processor and a modulation and demodulation processor may be integrated within the processor 180. The application processor mainly processes an operating system, a user interface and application programs and so on, and the modulation and demodulation processor mainly processes wireless communication. It should be understood that, the modulation and demodulation processor may not be integrated within the processor 180.

The client 1200 further includes a power supply 190 (for example a battery) for providing power for various components. Preferably, the power supply may be logically connected to the processor 180 via a power management system, and thereby charging, discharging and managing power consumption via the power management system. The power supply 190 may further include one or more direct current/alternate current power supplies, rechargeable systems, power supply fault detection circuits, power supply converters or inverters, power supply state indicators and so on.

Although it is not shown, the client 1200 may further include a camera or a Bluetooth module and so on, which is not described here. Specifically, in the embodiment, a display unit of the client is a touch screen display, and the client further includes a memory, and one or more programs. The one or more programs are stored in the memory, and it is configured, such that one or more processors execute one or more programs containing instructions for performing the following operations:

acquiring identifiers of data strings to be updated in an application data packet;

starting and running the application data packet; and acquiring update data for the data strings to be updated according to the identifiers of the data strings to be updated.

It is assumed that the above implementation is a first possible implementation, in a second possible implementation based on the first possible implementation, the memory of the client further contains instructions for performing the following operations:

acquiring, from a resource management server, a list of data to be updated of the application data packet, where the list of data to be updated includes the identifiers of the data strings to be updated and update priorities of the data strings to be updated in the application data packet.

In a third possible implementation based on the second possible implementation, the memory of the client further contains instructions for performing the following operations:

acquiring, from the resource server, update data for data strings having update priorities higher than a predetermined priority threshold, and updating the data strings having the update priorities higher than the predetermined priority threshold.

In a fourth possible implementation based on the third possible implementation, the memory of the client further contains instructions for performing the following operations:

acquiring, from the resource server, data strings to be updated having update priorities equal to or lower than the predetermined priority threshold, when the application data packet is run.

In a fifth possible implementation based on the second, the third or the fourth possible implementation, the memory of the client further contains instructions for performing the following operations:

acquiring, from the resource management server, identifiers of data strings to be removed in the application data packet; and deleting the data strings to be removed in the application data packet according to the identifiers of the data strings to be removed.

In a sixth possible implementation based on the fifth possible implementation, the memory of the client further contains instructions for performing the following operations:

sending a request for data to be removed to the resource management server, where the request for data to be removed carries an identifier of the application data packet; and receiving a list of data to be removed from the resource management server, where the list of data to be removed contains the identifiers of the data strings to be removed in the application data packet.

With the method provided by the embodiments of the present disclosure, the data strings to be updated in the application data packet can be acquired when the application data packet is run, thereby reducing waiting time of the user.

In another aspect, a computer readable storage medium is further provided according to still another embodiment of the present disclosure. The computer readable storage medium may be the computer readable storage medium contained in the memory in the above embodiments, or may be an independent computer readable storage medium which is not installed in the client. The computer readable storage medium stores one or more programs, and the one or more programs are used by one or more processors to perform a data update method. The method includes:

acquiring identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold;

acquiring update data for the data strings to be updated having the update priorities higher than the predetermined threshold according to the identifiers of the data strings to be updated and updating the data to be updated having the update priorities higher than the predetermined threshold, before the application data packet is started; and acquiring update data for the data strings to be updated having the update priorities lower than or equal to the predetermined threshold according to the identifiers of the data strings to be updated and updating the data to be updated having the update priorities lower than or equal to the predetermined threshold, after the application data packet is started.

It is assumed that the above implementation is a first possible implementation, in a second possible implementation based on the first possible implementation, the acquiring identifiers of data strings to be updated in an application data packet includes:

acquiring, from a resource management server, a list of data to be updated of the application data packet, where the list of data to be updated includes the identifiers of the data strings to be updated and the update priorities of the data strings to be updated in the application data packet.

In a third possible implementation based on the second possible implementation, the method may further include:

acquiring, from the resource management server, identifiers of data strings to be removed in the application data packet; and deleting the data strings to be removed in the application data packet according to the identifiers of the data strings to be removed.

In a fourth possible implementation based on the third possible implementation, the acquiring, from the resource management server, identifiers of data strings to be removed in the application data packet includes:

sending a request for data to be removed to the resource management server, where the request for data to be removed carries the identifier of the application data packet; and receiving a list of data to be removed from the resource management server, where the list of data to be removed includes the identifiers of the data strings to be removed in the application data packet.

Figure 11:
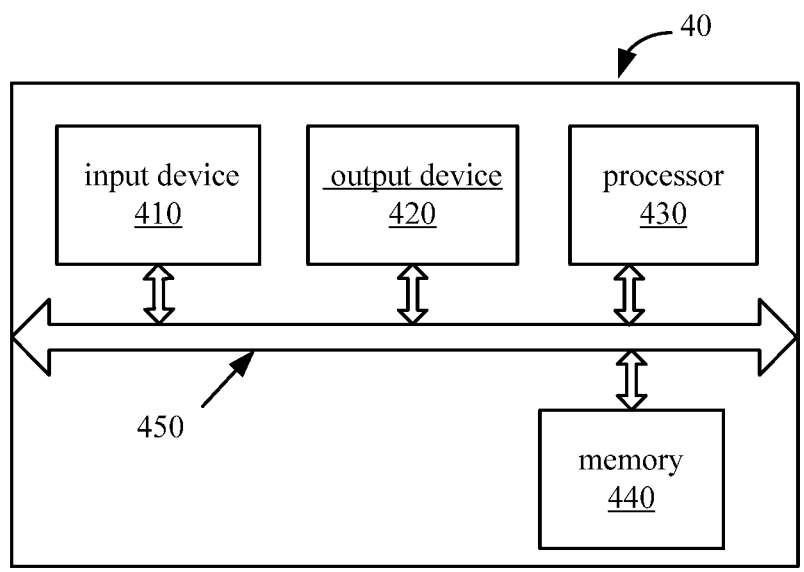
FIG. 11 is a schematic structural diagram of another server according to an embodiment of the present disclosure.

FIG. 11 is a schematic structural diagram of a server 40 according to an embodiment of the present disclosure. The server 40 may include an input device 410, an output device 420, a processor 430 and a memory 440.

The memory 440 may include a read only memory and a random access memory, and provide instructions and data to the processor 430. A portion of the memory 440 may include a non-volatile random access memory (NVRAM).

The memory 440 stores the following elements, executable modules or data structures, or a subset thereof or an extension set thereof:

operation instructions: including various types of operation instructions for performing various operations; and operating systems: including various types of system programs for performing various basic services and processing tasks based on hardware.

In the embodiments of the present disclosure, the processor 430 performs the following operations by calling operation instructions stored in the memory 440 (the operation instructions may be stored in the operating system):

receiving, by the input device 410, a request for data to be updated from a client, where the request for data to be updated carries an identifier of the application data packet;

acquiring, according to the identifier of the application data packet, identifiers of data strings to be updated in the application data packet; and returning, by the output device 420, the identifiers of the data strings to be updated to the client.

In the embodiment of the present disclosure, the server 40 can enable the client to acquire the data strings to be updated in the application data packet when running the application data packet, and thereby reducing waiting time of the user.

The processor 430 controls an operation of the server 40, and the processor 430 may also be referred to as a central processing unit (CPU). The memory 440 may include a read only memory and a random access memory, and provides instructions and data to the processor 430. A portion of the memory 440 may further include a non-volatile random access memory (NVRAM). In specific applications, various components of the server 40 are coupled together via a bus system 450, where the bus system 450 may further include a power supply bus, a control bus and a state signal bus and so on, in addition to a data bus. However, for clearance, various types of bus are indicated as the bus system 450 in FIG. 11.

The method disclosed by the embodiments of the present disclosure above may be applied to the processor 430 or implemented by the processor 430. The processor 430 may be an integrated circuit chip having signal processing capability. During the process of implementation, various steps in the above method may be performed by an integrated logic circuit of hardware or instructions of software in the processor 430. The above processor 430 may be a general processor, a digital signal processor (DSP), an application specific integrated circuit (ASIC), a field programmable gate array (FPGA) or other programmable logic devices, a discrete gate or transistor logic device, a discrete hardware component. It may achieve or perform various methods, steps and logic block diagrams in the embodiments of the present disclosure. The general processor may be a microprocessor or any conventional processor. Steps of the method disclosed in conjunction with the embodiments of the present disclosure may be performed by a hardware decoding processor or may be performed by a hardware module in combination with a software module in the decoding processor. The software module may be located in the conventional storage medium in the art, for example a random memory, a flash memory, a read only memory, a programmable read only memory, an electric erasable programmable memory, or a register. The storage medium is located in the memory 440, and the processor 430 reads information in the memory 440 and performs steps of the above methods in combination with hardware.

Optionally, the processor 430 may further acquire update priorities of data strings to be updated.

The output device 420 is configured to return a list of data to be updated of the application data packet to the client, where the list of data to be updated includes the identifiers of the data strings to be updated and the update priorities of the data strings to be updated in the application data packet.

Optionally, the input device 410 receives a request for data to be removed from the client, where the request for data to be removed carries the identifier of the application data packet.

The processor 430 acquires identifiers of data strings to be removed in the application data packet according to the identifier of the application data packet.

The output device 420 sends a list of data to be removed to the client, where the list of data to be removed includes the identifiers of the data strings to be removed in the application data packet.

Figure 12:
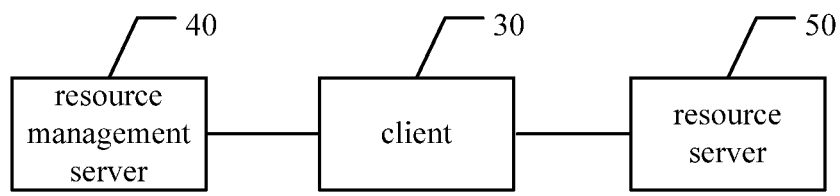
FIG. 12 is a schematic structural diagram of a data update system according to an embodiment of the present disclosure.

As shown in FIG. 12, a data update system provided according to an embodiment of the present disclosure includes: a client 30, a resource management server 40 and a resource server 50. The client 30 is communicatively connected to the resource management server 40 and the resource server 50.

The client 30 is configured to acquire, from the resource management server 40, identifiers and update priorities of data strings to be updated in an application data packet, where the data strings to be updated are classified, according to a predetermined threshold, as data strings to be updated having update priorities higher than the predetermined threshold and data strings to be updated having update priorities lower than or equal to the predetermined threshold; acquire update data for the data strings to be updated having the update priorities higher than the predetermined threshold from the resource server according to the identifiers of the data strings to be updated, and update the data strings to be updated having the update priorities higher than the predetermined threshold, before the application data packet is started; and acquire update data for the data strings to be updated having the update priorities lower than or equal to the predetermined threshold from the resource server 50 according to the identifiers of data strings to be updated, and update the data to be updated having the update priorities lower than or equal to the predetermined threshold after the application data packet is started.

The resource management server 40 is configured to send the identifiers and the update priorities of the data strings to be updated in the application data packet to the client 30, and receive a request for data to be updated from the client, where the request for data to be updated carries application data.

The resource server 50 is configured to provide the update data for the data strings to be updated to the client 30.

Those skilled in the art should understand that all or a part of steps of the various methods in the above embodiments may be performed by related hardware instructed by programs, and the programs may be stored in computer readable storage mediums, which may include a ROM, an RAM, a magnetic disc or an optical disc or the like.

The data update method, the client, the server and the system provided by the embodiments of the present disclosure are described in detail above. Principles and implementations of the present disclosure are clarified using specific examples herein, and the description of the above embodiments is only intended to help understanding the method in the present disclosure and a key concept thereof. In addition, those skilled in the art may make changes to the specific implementations and the application scope according to the concept of the predetermined disclosure. In summary, the content of the description should not be understood as limiting the present disclosure.

The invention claimed is:

1. A data update method, comprising:
acquiring identifiers and update priorities of a plurality of data strings to be updated in an application data packet, wherein the plurality of data strings to be updated are classified, according to a predetermined threshold, wherein a first set of data strings of the plurality of data strings to be updated having update priorities higher than the predetermined threshold, wherein a second set of data strings of the plurality of data strings to be updated having update priorities lower than or equal to the predetermined threshold, and wherein the plurality of data strings are file resources used by the application data packet;
before the application data packet is started,
acquiring update data from a resource server for the first set of data strings to be updated having the update priorities higher than the predetermined threshold according to the identifiers of the first set of data strings to be updated and updating the first set of data strings having the update priorities higher than the predetermined threshold by applying the acquired update data to the first set of data strings;
starting the application data packet utilizing the updated first set of data strings;
after the application data packet is started,
acquiring update data from the resource server for the second set of data strings to be updated having the update priorities lower than or equal to the predetermined threshold according to the identifiers of the second set of data strings to be updated and updating the second set of data strings having the update priorities lower than or equal to the predetermined threshold by applying the acquired update data to the second set of data strings;
in response to updating the second set of data strings,
acquiring, from a resource management server, identifiers of data strings to be removed in the application data packet; deleting, according to the identifiers of the data strings to be removed, the data strings to be removed in the application data packet.

2. The method according to claim 1, wherein the acquiring identifiers and update priorities of a plurality of data strings to be updated in an application data packet comprises:
acquiring, from the resource management server, a list of data to be updated of the application data packet, wherein the list of data to be updated comprises the identifiers of the data strings to be updated and the update priorities of the data strings to be updated in the application data packet.

3. The method according to claim 2, wherein the acquiring, from the resource management server, a list of data to be updated of the application data packet comprises:
sending a request for updating data to the resource management server, wherein the request for updating data carries an identifier of the application data packet; and
receiving the list of data to be updated of the application data packet from the resource management server.

4. The method according to claim 1, wherein the acquiring identifiers of data strings to be removed in the application data packet comprises:
sending a request for removing data to a resource management server, wherein the request for removing data carries an identifier of the application data packet; and
receiving a list of data to be removed from the resource management server, wherein the list of data to be removed comprises the identifiers of the data strings to be removed in the application data packet.

5. A client, comprising one or more processors and a storage medium storing operation instructions, wherein when the operation instructions in the storage medium are run, the processors are configured to:
acquire identifiers and update priorities of a plurality of data strings to be updated in an application data packet, wherein the plurality of data strings to be updated are classified, according to a predetermined threshold, wherein a first set of data strings of the plurality of data strings to be updated having update priorities higher than the predetermined threshold, wherein a second set of data strings of the plurality of data strings to be updated having update priorities lower than or equal to the predetermined threshold, and wherein the plurality of data strings are file resources used by the application data packet;
before the application data packet is started,
acquire update data from a resource server for the first set of data strings to be updated having the update priorities higher than the predetermined threshold according to the identifiers of the first set of data strings to be updated and update the first set of data strings having the update priorities higher than the predetermined threshold by applying the acquired update data to the first set of data strings;
start of the application data packet utilizing the updated first set of data strings;
after the application data packet is started,
acquire update data from the resource server for the second set of data strings to be updated having the update priorities lower than or equal to the predetermined threshold according to the identifiers of the second set of data strings to be updated and update the second set of data strings having the update priorities lower than or equal to the predetermined threshold by applying the acquired update data to the second set of data strings;
in response to updating the second set of data strings,
acquire, from a resource management server, identifiers of data strings to be removed in the application data packet; delete, according to the identifiers of the data strings to be removed, the data strings to be removed in the application data packet.

6. The client according to claim 5, wherein the processors are configured to:
acquire, from the resource management server, a list of data to be updated of the application data packet, wherein the list of data to be updated comprises the identifiers of the data strings to be updated and the update priorities of the data strings to be updated in the application data packet.

7. The client according to claim 6, wherein the processors are configured to:
send an request for updating data to the resource management server, wherein the request for updating data carried an identifier of the application data packet; and
receive the list data to be updated of the application data packet from the resource management server.

8. The client according to claim 5, wherein the processors are configured to:
send a request for removing data to a resource management server, wherein the request for removing data carries an identifier of the application data packet; and
receive a list of data to be removed from the resource management server, wherein the list of data to be removed comprises the identifiers of the data strings to be removed in the application data packet.

9. A data update system, comprising a client, a resource management server and a resource server, wherein the client is communicatively connected to the resource management server and the resource server respectively, wherein:
the client is configured to acquire, from the resource management server, identifiers and update priorities of a plurality of data strings to be updated in an application data packet, wherein the plurality of data strings to be updated are classified, according to a predetermined threshold, wherein a first set of data strings of the plurality of data strings to be updated having update priorities higher than the predetermined threshold, wherein a second set of data strings of the plurality of data strings to be updated having update priorities lower than or equal to the predetermined threshold, and wherein the plurality of data strings are file resources used by the application data packet; before the application data packet is started, acquire update data from the resource server for the first set of data strings to be updated having the update priorities higher than the predetermined threshold from the resource server according to the identifiers of the first set of data strings to be updated and update the first set of data strings having the update priorities higher than the predetermined threshold by applying the acquired update data to the first set of data strings; start the application data packet utilizing the updated first set of data strings; after the application data packet is started, acquire update data from the resource server for the second set of data strings to be updated having the update priorities lower than or equal to the predetermined threshold from the resource server according to the identifiers of the second set of data strings to be updated and update the second set of data strings having the update priorities ower than or equal to the predetermined threshold by applying the acquired update data to the second set of data strings; in response to updating the second set of data strings, acquire, from the resource management server, identifiers of data strings to be removed in the application data packet; delete, according to the identifiers of the data strings to be removed, the data strings to be removed in the application data packet,
the resource management server is configured to send the identifiers and the update priorities of the plurality of data strings to be updated in the application data packet to the client; and
the resource server is configured to provide the update data for the plurality of data strings to be updated to the client.

* * * * *